July 21, 1959

L. O. CARLSEN 2,895,385

FEED MECHANISM FOR A MACHINE FOR
CUTTING GEARS AND THE LIKE

Filed March 10, 1958

INVENTOR.
LEONARD O. CARLSEN
BY
Richard W. Treverton
ATTORNEY

July 21, 1959

L. O. CARLSEN 2,895,385

FEED MECHANISM FOR A MACHINE FOR
CUTTING GEARS AND THE LIKE

Filed March 10, 1958

FEED MECHANISM FOR A MACHINE FOR CUTTING GEARS AND THE LIKE

Leonard O. Carlsen, Rochester, N.Y., assignor to The Gleason Works, Rochester, N.Y., a corporation of New York Application March 10, 1958, Serial No. 720,221

15 Claims. (Cl. 90—6)

The invention relates to machines for cutting gears and the like, and particularly to such machines of the kind in which the tool cuts intermittently and during the cutting cycle there is a relative feed motion between the tool and the work.

In such machines, particularly in bevel gear roughing machines having reciprocating cutting tools, it has been conventional to provide a cam for effecting the feed motion and, at the conclusion of such motion, after one tooth has been cut to full depth, a return motion which separates the tools and the work sufficiently to allow tooth-to-tooth indexing of the latter preparatory to the next feed motion. The feed comprises a slow motion of a slide and, due to inherent resilience of the actuating mechanism, is sometimes uneven. This is thought to be caused by the tool in the cut tending to resist continuous infeed of the slide, such resistance varying in degree, and by the slide then springing ahead by an amount which also is variable when the tool leaves the cut. The uneven infeed reduces tool life and either lowers the quality of the tooth surface finish or requires the machine to be operated at a lower speed than otherwise would be feasible, or both. The primary object of the present invention is to eliminate these difficulties by providing a mechanism for effecting the feed only during the intervals between successive cuts by the tool or tools and for maintaining the slide clamped to the machine frame while there is actual cutting.

A machine according to the invention has a tool arranged to cut intermittently and a slide movable on its support for effecting a feed motion between the tool and the workpiece, feed means for urging such feed motion of said slide, a cam or other movable stop for limiting the feed motion, a clamp for securing said slide to the support, and a control for the clamp operating in time with the tool for maintaining the clamp applied while the tool is cutting and for releasing it when the tool is idle to thereby allow feed motion to the extent permitted by the movable stop.

A preferred embodiment of the invention is shown in the accompanying drawings, wherein.

Figure 2:
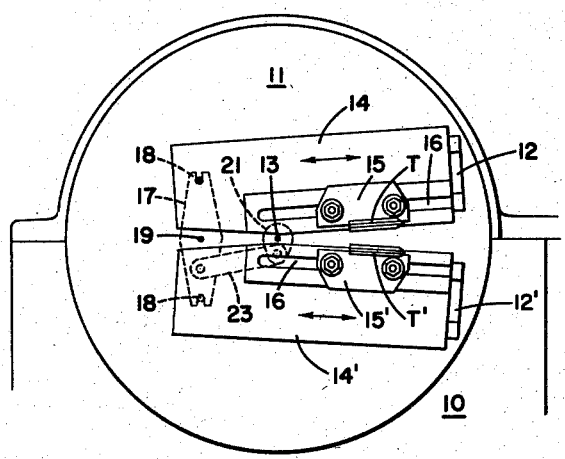
Fig. 2 is an elevation of the tools and tool supporting structure of the machine, looking toward the left in Fig. 1.

The machine comprises a frame 10 having a drum-shaped tool support 11 on which upper and lower tool guideways 12 and 12' are adjustable about a horizontal axis 13. Reciprocable on the respective guideways in the direction of the arrows in Fig. 2 are slides 14 and 14' on which holders 15 and 15' for tools T and T' are mounted for adjustment along slots 16. The tool slides are reciprocated by a lever 17 which is pivotally connected to them at 18 and is fulcrumed to the support 11 on axis 19. The lever is rocked by a crank 21 on a shaft 22, Fig. 4, extending along axis 13, the crank being connected to the lever by a pitman 23.

Each tool cuts on the stroke in which it is moving toward the axis 13. The guides 12 are so adjusted that the tools cut the opposite sides of the same tooth of a gear blank G mounted on the work spindle 24. This spindle is journaled for rotation about horizontal axis 25 in a work head 26 which is adjustable, in the direction of axis 25, along ways 27 of a swinging base 28. The latter is angularly adjustable along circular ways 29, about a vertical axis 31, on a slide 32 which is movable rectilinearly along ways 33 on the frame 10 in a direction parallel to axis 13. The three axes 13, 25 and 31 intersect at a common point.

The crank shaft 22 is driven by a motor 34 through bevel gears 35, shaft 36, tool speed change gears 37, shaft 38, and bevel gears 39. The work spindle 24 is indexed periodically, at times when the slide 32 is withdrawn along ways 33 to withdraw the work gear G clear of the tools. Such indexing is effected by a Geneva-type index comprising a driver 41 and a driven wheel 42, there being a roller 43 on the driver which engages in one of several radial slots in the driven member to advance the latter angularly once during each rotation of the driver. The driver is driven from shaft 36 through ratio change gears 44, shaft 45, bevel gears 46, shaft 47, gears 48 and 49, and the shaft 51 of the driver. The index driven member 42 drives the work spindle 24 through a gear train comprising spur gears 52 and 53, telescoping shaft 54, bevel gears 55, shaft 56, bevel gears 57 and 58, telescoping shaft 59, bevel gears 61, index change gears 62 and worm 63 meshing with worm wheel 64 on the work spindle. Telescoping shaft 54 parallels ways 33 and thus permits the motion of side 32; shaft 56 extends along vertical axis 31 enabling angular adjustment of swinging base 28; and telescoping shaft 59 parallels ways 27, thus permitting adjustment of work head 26. By changing the ratio of gears 44 the frequency of indexing is varied; and by changing the ratio of gears 62 the angle through which the work spindle is advanced during each indexing operation is varied.

Figure 3:
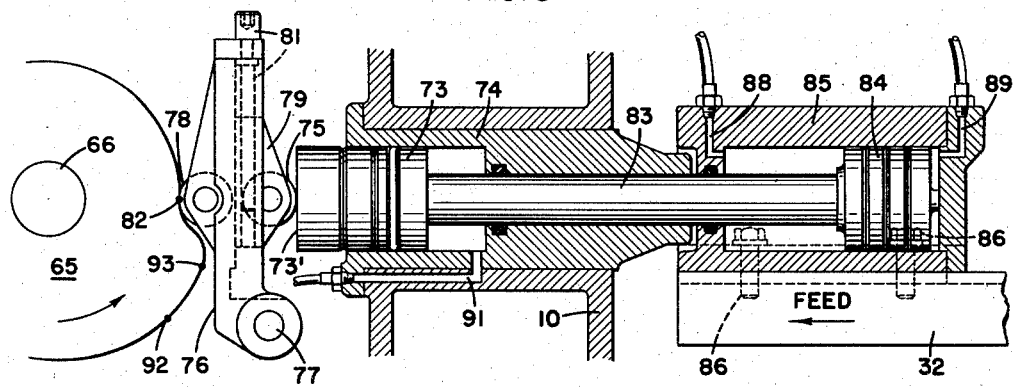
Fig. 3 is a detail vertical section in plane 3—3 of Fig. 1.

In the illustrated embodiment the feed between the tools and the work is effected by moving the work-carrying slide 32 on its support, frame 10. This feed is effected by hydraulically operated feed means and is limited by movable stop comprising a cam 65, which is so arranged as to also effect the return motion of the slide. The cam is mounted on a shaft 66 which is rotatable in the frame and makes one revolution for each indexing operation, i.e. one revolution during the cutting of each tooth of the work gear. It is driven from shaft 47 through bevel gears 67, spur gears 68, bevel gears 69, worm 71 and worm wheel 72. The hydraulically operated feed means comprises a piston 73 reciprocable in a cylinder 74 supported by frame 10, the piston having a plane end face bearing on roller 75 of a cam follower lever 76. This lever is fulcrumed on the frame by a pin 77 and carries another roller 78 bearing on the periphery of the cam. Roller 75 is carried by a block 79 which is adjustable on the lever by means of a screw 81 to vary the distance of the roller 75 from the fulcrum 77 and thereby vary the length of the feed stroke. The direction of this adjustment of block 79 is parallel to the face 73' of the piston contacted by the roller, i.e. perpendicular to the direction of motion of the piston, in the particular position of the lever shown in Fig. 3. This is the position of the lever at the conclusion of the feed motion, when the roller 78 bears on the low point 82 of the cam. Because of this arrangement the adjustment of the block 79 does not affect the infeed position of piston 73 or of the parts which move with it.

Figure 1:
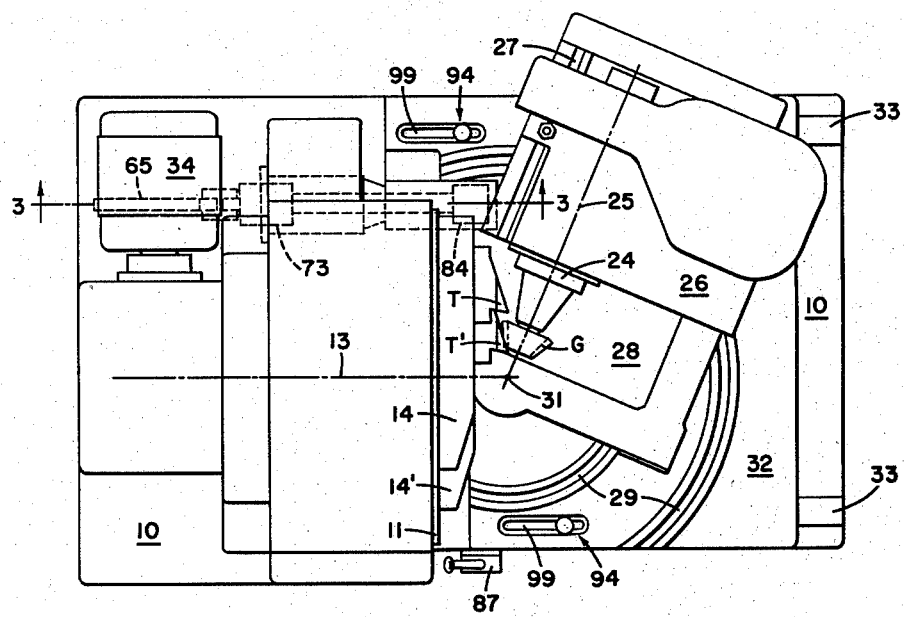
Fig. 1 is a plan view of the machine.

Piston 73 is connected by rod 83 to a second piston, 84, that is reciprocable in a cylinder 85, and the cylinder is adjustable on the slide 32, in the same direction as the feed motion, upon loosening clamp screws 86. By this adjustment the position of gear G at the end of the infeed can be varied, for example to accommodate tools T, T' of greater or smaller extent in the direction of axis 13. By means of a manually operable valve 87, Fig. 1, fluid pressure from a suitable source, not shown, is directed into the cylinder 85 either through port 88 or 89 to respectively move the slide 32 to its limit position relative to piston 84 shown in Figs. 1 and 3, which is the cutting position, or to its opposite limit position, to the right in these views, in which position the slide is withdrawn to enable chucking or dechucking of a workpiece. While the machine is operating hydraulic fluid under pressure is constantly applied through port 91 to the chamber of cylinder 20 of the assembly 73, 83, 84, 85, 32 (to the left in Figs. 1 and 3) such motion being limited by the cam 65. The cam rotates counterclockwise in Fig. 3 to progressively bring the portions thereof from high point 92 to low point 82 beneath the roller as cutting proceeds. Point 92 represents one end of a high dwell portion of the cam, the other end of the dwell being point 93. While the portions of the cam from low point 82 to high point 93 pass beneath the roller, the follower lever 76 and the piston and slide assembly is returned, i.e. moved to the right in Fig. 3, far enough to clear the workpiece from the tools. While the dwell portion of the cam is beneath the roller, the aforedescribed indexing operation takes place.

Figure 4:
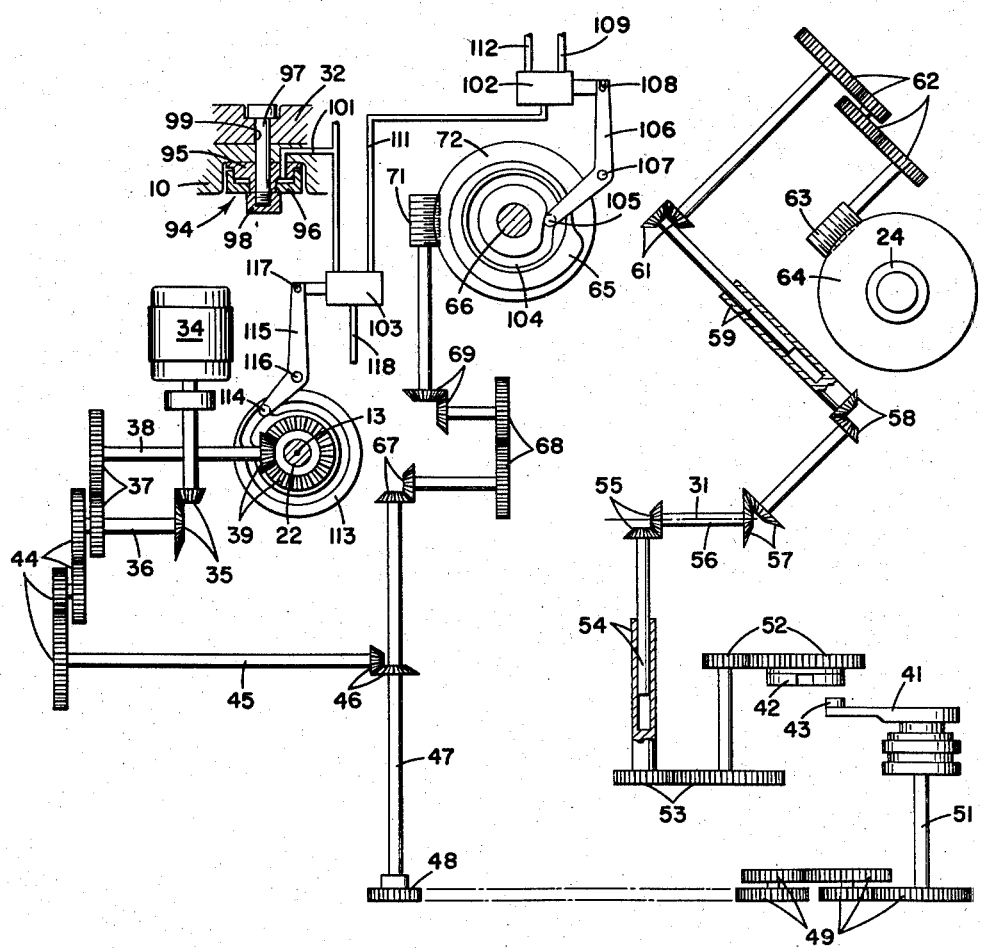
Fig. 4 is a diagram showing the machine drive and that part of the hydraulic system that is related to the present invention.

Although hydraulic pressure acts constantly on piston 73 while the machine is in operation, the feed motion limited by portions 92—82 of cam 65 takes place only during the interval between the conclusion of each cutting stroke of tool T and the beginning of the following cutting stroke of tool T'. While the tools are actually cutting the slide 32 is clamped to frame 10 by clamps 94, of which two identical units are provided in the machine illustrated. As shown in Fig. 4 each of these two clamps comprises a piston 95 secured to the frame, a cylinder 96 telescoped over the piston for vertical sliding motion thereon, and a screw and nut 97, 98, the shank of the screw extending through an elongated slot 99 in the slide. Upon application of hydraulic pressure to the cylinder chamber through passage 101, the cylinder 96 is urged downwardly so that the head of screw 97 clamps the slide 32 to the frame. The application and release of the clamps is controlled by slide valves 102 and 103. Valve 102 is actuated by a cam 104 having a closed cam path which confines a follower roller 105 carried by a lever 106, the lever being fulcrumed at 107 to the frame and pivotally connected at 108 to the valve slide. The arrangement is such that while the portions of the cam 65 extending clockwise from point 92 to point 82 are beneath roller 78, i.e. during the period of feed motion of slide 32, the valve 102 connects a line 109, which extends to a suitable source of hydraulic pressure, to a conduit 111 leading to valve 103. In all other positions of cam 65, i.e. during the return of slide 32 and during indexing, the valve 102 connects line 111 to a return line 112 leading to a sump in the hydraulic system. Valve 103 is actuated by a cam 113 secured to crank shaft 22, this cam having a closed cam path confining follower roller 114 of a lever 115 that is fulcrumed to the frame at 116 and is pivotally connected at 117 to the slide of valve 103. The cam path and the valve are so arranged that in the positions of crank shaft 22 between the conclusion of cutting by tool T and the beginning of cutting by tool T', i.e. while tool operating lever 17 is near the limit of its swing in a counterclockwise direction in Fig. 2, the valve 103 connects line 101 to a return line 118 leading to the sump of the hydraulic system, and that at all other times the valve connects line 101 to line 111.

Thus it will be seen that at all times while the tools are cutting, pressure is applied through line 101 to the two clamps 94, thereby clamping the slide 32 to the frame 10; and at the conclusion of every cutting stroke of tool T this clamping pressure is momentarily released to allow feed motion by hydraulic pressure against piston 73, such feed motion being to the limited extent permitted by cam 65. Although the feed is intermittent the active surface of cam 65 is continuous. Hence the same cam may be used irrespective of the number of reciprocations of the tools per revolution of the cam, this number depending upon the ratio of change gears 37 and 44.

Having now described the preferred machine embodiment and its mode of operation, what I claim as my invention is:

1. A machine for cutting gears or the like having a tool arranged to cut intermittently and a slide movable on its support for effecting a feed motion between the tool and the workpiece, feed means for urging such feed motion of said slide, a cam for limiting the feed motion, a clamp for securing said slide to the support, and a control for the clamp operating in time with the tool for maintaining the clamp applied while the tool is cutting and for releasing it when the tool is idle to thereby allow feed motion to the extent permitted by the cam.

2. A machine according to claim 1 in which the cutting tool is arranged to reciprocate and the cam is arranged to rotate in such timed relation to the reciprocation as to cause one cycle of feed motion and return motion of the slide while the tool makes a number of reciprocations.

3. A machine according to claim 2 in which the control for the clamp includes means to release the clamp during the return motion.

4. A machine according to claim 2 in which there are two such tools connected for reciprocation in opposed relationship and for alternate cutting, and the control for the clamp is arranged to release and reapply the clamp in the interval between the conclusion of each cut of one tool and the beginning of each cut of the other tool.

5. A machine according to claim 1 having a cam follower comprising a pivoted lever, a first roller on the lever for engagement with the cam, a second roller on the lever for engagement with a part movable with the slide, the surface of the part engaged by the second roller extending at right angles to the direction of feed motion, and means for adjusting the second roller on the lever in a direction which is also at right angles to the direction of feed motion in the position of the lever at the conclusion of the feed motion.

6. A machine according to claim 5 in which the cam is mounted for rotation on said support and the lever is pivoted to said support.

7. A machine according to claim 5 in which there is a means for adjusting said part relative to the slide in the direction of the feed motion.

8. A machine according to claim 1 in which the feed means comprises a cylinder secured to said support and a piston reciprocable in the cylinder.

9. A machine according to claim 8 in which there is a second piston reciprocable as a unit with the first-mentioned piston, and a cylinder for said second piston secured to the slide.

10. A machine according to claim 9 in which there is a means for adjusting the last-mentioned cylinder on the slide in the direction of reciprocation of the pistons.

11. A machine according to claim 1 in which said clamp is hydraulically actuated and the control for the clamp comprises a valve for controlling the application of hydraulic pressure to the clamp and means operable in time with the tool for operating the valve.

12. A machine according to claim 11 in which there is a rotary crankshaft for reciprocating the tool and the means for operating the valve comprises a cam on the crankshaft.

13. A machine according to claim 11 in which the control for the clamp includes a second valve for also controlling the application of hydraulic pressure to the clamp and means operable in time with the feed-motion-limiting cam for operating the second valve.

14. A machine according to claim 13 in which the means for operating the second valve comprises a cam rotatable in unison with said feed-motion-limiting cam.

15. A machine for cutting gears or the like having a tool arranged to cut intermittently and a slide movable on its support for effecting a feed motion between the tool and the workpiece, feed means for urging such feed motion of said slide, a movable stop for limiting the feed motion and means for moving the stop as the cutting operation proceeds, a clamp for securing the slide to the support, and a control for the clamp operating in time with the tool for maintaining the clamp applied while the tool is cutting and for releasing it when the tool is idle to thereby allow feed motion to the extent permitted by the stop.

No references cited.